United States Patent Office 3,298,800
Patented Jan. 17, 1967

3,298,800
METHOD FOR PREPARING METAL
ALUMINUM HYDRIDES
Robert C. Wade, Beverly, Mass., assignor to Metal Hydrides Incorporated, Beverly, Mass., a corporation of Massachusetts
No Drawing. Filed May 3, 1963, Ser. No. 277,708
10 Claims. (Cl. 23—365)

This application is a continuation-in-part of application Ser. No. 11,434, filed February 29, 1960, now abandoned.

This invention relates to a method for preparing metal aluminum hydrides having the formula $M(AlH_4)_x$ where M is a metal selected from alkali metals and alkaline earth metals and $x$ is the valence of the metal. More particularly, the invention relates to a method for preparing sodium aluminum hydride.

The patent to H. I. Schlesinger and A. E. Finholt No. 2,567,972, dated September 18, 1951, describes a method for preparing a metal aluminum hydride having the above formula. This method comprises reacting a hydride of an alkali metal or alkaline earth metal with an aluminum halide in an ether medium. The reaction is illustrated by the equation:

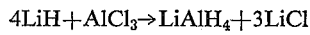

$$4LiH + AlCl_3 \rightarrow LiAlH_4 + 3LiCl$$

Lithium aluminum hydride of high purity has been prepared in high yield commercially for several years by this method. However, the method has not been found satisfactory for the preparation of sodium aluminum hydride and other metal aluminum hydrides.

I have discovered a method whereby sodium aluminum hydride and other alkali metal or alkaline earth metal aluminum hydrides having the formula $M(AlH_4)_x$ can be synthesized directly from the elements. In accordance with the method of the present invention, an alkali metal, such as sodium, potassium or lithium, or alkaline earth metal, such as calcium or magnesium, or the hydride of such alkali metals or alkaline earth metals, is heated at an elevated temperature in a confined reaction zone with finely divided aluminum metal and a catalytic amount of a reaction promotor in an inert liquid carrier in the presence of hydrogen under superatmospheric pressure while agitating the mixture until reaction between the aluminum, hydrogen and the alkali metal or alkaline earth metal or hydride thereof is complete. I have found a temperature between about 100° C. and 200° C. and a hydrogen pressure between about 2500 and 5000 pounds per square inch to be suitable. Higher pressures may be used but are not necessary.

Suitable reaction promotors for use in the practice of the invention are alkali metal complexes of an organic compound of the type of naphthalene, anthracene, biphenyl (diphenyl), benzophenone, phenanthrene, terphenyl, tetraphenyl ethylene, and other unsaturated hydrocarbons, aromatic ketones and aromatic nitriles. These complexes are prepared by reacting the alkali metal with the organic compound at low temperatures, such as between about minus 10° to plus 30° C., in the presence of dimethyl ether or similar ethers of high oxygen content, such as dioxan, tetrahydrofuran and the dimethyl ether of ethylene glycol. Their preparation is described in Jour. Am. Chem. Soc., vol. 58, page 2442 (1936) in an article by N. D. Scott, J. F. Walker and V. L. Hansley; Trans. Faraday Soc., vol. 51, pages 1375–86 (1955) in an article by D. J. Morantz and E. Warhurst; and on pages 309 to 312 of the book by Marshall Sittig entitled, "Sodium—Its Manufacture, Properties and Uses," published by Reinhold Publishing Corporation (1956).

The amount of such promoter used in the practice of the invention may vary from 0.1 to 25.0 percent or more by weight based upon the weight of the alkali metal or alkaline earth metal initially in the reaction mixture. Suitable inert liquid carriers are saturated liquid hydrocarbons, such as hexane; the lower dialkyl ethers, such as dimethyl ether and diethyl ether; and ethers, such as tetrahydrofuran, dioxan and the dimethyl ether of ethylene glycol.

The invention is illustrated further by the following specific example.

8 grams of 30 mesh aluminum metal, 6.2 grams of sodium metal, 2 grams of sodium naphthalene complex and 125 ml. of tetrahydrofuran were charged into a 250 ml. Magne-Dash reactor fitted with a magnetic agitator and suitable heating means. Hydrogen was introduced into the reactor under a pressure of about 3000 p.s.i. The reaction mixture was then heated for 20 hours at a temperature of about 150° C. with continuous agitation. 10.3 grams of sodium aluminum hydride was isolated from the reaction mixture having a purity of 96 percent and representing a yield of 71 percent.

I claim:

1. The method for preparing a metal aluminum hydride having the formula $M(AlH_4)_x$ where M is a metal selected from the group consisting of alkali metals and alkaline earth metals and $x$ is the valence of said metal which comprises heating in a confined reaction zone a material selected from the group consisting of alkali metals, alkaline earth metals and hydrides thereof with a finely divided aluminum metal and from about 0.1 to 25.0 percent by weight based upon the weight of said selected material used of a reaction promotor in an inert liquid carrier selected from the group consisting of hexane, dimethyl ether, diethyl ether, tetrahydrofuran, dioxan, and dimethyl ether of ethylene glycol at a temperature above about 100° C. but below the decomposition temperature of the metal aluminum hydride in the presence of hydrogen under superatmospheric pressure above about 2500 p.s.i. while agitating the mixture until reaction between the aluminum, hydrogen and said selected material is substantially complete, said reaction promotor being an alkali metal complex of an organic compound selected from the group consisting of naphthalene, anthracene, phenanthrene, biphenyl, terphenyl, and tetraphenyl ethylene prepared by reacting said organic compound with an alkali metal in the presence of an ether of high oxygen content selected from the group consisting of dioxan, tetrahydrofuran, and dimethyl ether of ethylene glycol at a temperature between about minus 10° and plus 30° C.

2. The method as described by claim 1 wherein said elevated temperature is between about 100° C. and 200° C.

3. The method as described by claim 1 wherein said pressure is between about 2500 and 5000 p.s.i.

4. The method as described by claim 1 wherein the reaction promoter is a sodium complex of naphthalene.

5. The method as described by claim 1 wherein the reaction promotor is a sodium complex of anthracene.

6. The method as described by claim 1 wherein the reaction promotor is a sodium complex of biphenyl.

7. The method as described by claim 1 wherein the reaction promoter is a sodium complex of terphenyl.

8. The method as described by claim 1 wherein the inert liquid carrier is tetrahydrofuran.

9. The method as described by claim 1 wherein said selected material is sodium metal.

10. The method as described by claim 1 wherein said selected material is sodium hydride.

References Cited by the Examiner
UNITED STATES PATENTS 2,372,671   4/1945   Hansley _____ 23—204

FOREIGN PATENTS 1,235,680   5/1960   France.

OTHER REFERENCES

Scott et al.: "Journal of the American Chemical Society," vol. 58, pp. 2442–2444 (1936).

OSCAR R. VERTIZ, *Primary Examiner.*

MILTON WEISSMAN, *Examiner.*